United States Patent
Poirier

(10) Patent No.: US 10,461,368 B2
(45) Date of Patent: Oct. 29, 2019

(54) DEUTERATED ELECTROLYTE SOLVENTS

(71) Applicant: Ford Global Technologies, LLC, Dearborn, MI (US)

(72) Inventor: Eric Poirier, Brownstown, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 100 days.

(21) Appl. No.: 15/870,237

(22) Filed: Jan. 12, 2018

(65) Prior Publication Data
US 2019/0221888 A1 Jul. 18, 2019

(51) Int. Cl.
*H01M 10/0569* (2010.01)
*H01M 10/0568* (2010.01)
*H01M 10/0525* (2010.01)

(52) U.S. Cl.
CPC ... *H01M 10/0569* (2013.01); *H01M 10/0525* (2013.01); *H01M 10/0568* (2013.01); *H01M 2300/004* (2013.01)

(58) Field of Classification Search
CPC ......... H01M 10/0569; H01M 10/0568; H01M 10/0525; H01M 2300/004
See application file for complete search history.

(56) References Cited

U.S. PATENT DOCUMENTS

| | | | |
|---|---|---|---|
| 7,579,117 B1 * | 8/2009 | Beard | G21B 3/00 429/305 |
| 9,293,773 B2 | 3/2016 | Smart et al. | |
| 9,300,009 B2 | 3/2016 | Sun et al. | |
| 9,472,829 B2 | 10/2016 | Aoki et al. | |
| 2015/0104716 A1 | 4/2015 | Kang et al. | |
| 2017/0149091 A1 | 5/2017 | Roev et al. | |

OTHER PUBLICATIONS

Hashimoto, Mana, et al. "Mechanism of Gas Generation in Lithium Ion Batteries by Overdischarge." ECS Transactions 69.20 (2015): 17-22 (Abstract).

* cited by examiner

*Primary Examiner* — Stewart A Fraser
(74) *Attorney, Agent, or Firm* — David B. Kelley; Brooks Kushman P.C.

(57) ABSTRACT

The disclosure generally relates to rechargeable batteries, for example, lithium-ion batteries including electrolytes with deuterated solvents. The use of deuterated solvents in the synthesis of lithium-ion electrolytes in rechargeable cells or batteries increases the chemical stability of the cell or batteries by reducing the rate of hydrogen related reactions during decomposition or inhibiting some of these parasitic reactions.

20 Claims, 1 Drawing Sheet

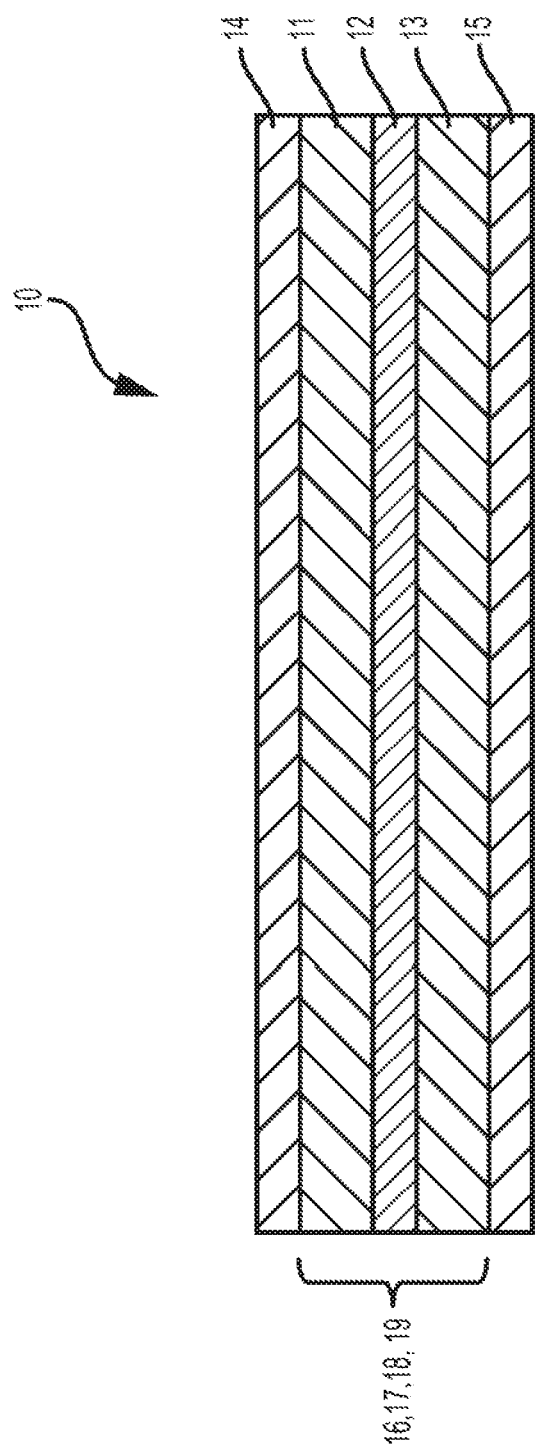

DEUTERATED ELECTROLYTE SOLVENTS

TECHNICAL FIELD

The disclosure generally relates to rechargeable batteries such as lithium-ion batteries including electrolytes with deuterated solvents.

BACKGROUND

Lithium-ion batteries are commonly used in many applications. For automotive applications, lithium-ion batteries are used in hybrid, plug-in hybrid, and all-electric vehicles. Lithium-ion batteries are also used in many other applications including portable electronics such as cell phones. These batteries can include organic liquid electrolytes such as alkyl carbonates. Liquid electrolytes generally have a wide electrochemical window, good ionic conductivity, and chemical stability. However, decomposition of the electrolyte can lead to a reduction in charge and power capabilities, as well as generation of gas products such as $H_2$, $CH_4$, $CO_2$, and various hydrocarbons such as ethylene, ethane, or propene. The formed gases can cause pressure build-up, cell swelling, loss of internal contacts, cell imbalance, changes in heat transfer properties, etc. Decomposition can result from normal cell aging or from abuse conditions such as excessive temperature, current, or voltage. At the molecular level, electrolyte decomposition is partly due to hydrogen being plucked out of solvent molecules such as ethylene carbonate, dimethyl carbonate, diethyl carbonate, or ethyl methyl carbonate to participate in parasitic reactions producing gases and degrading cell performance. Hydrogen may also constitute up to about 30% volume/volume of the gas evolving during an abuse test, and can also be partially involved in numerous parasitic reactions producing hydrocarbons. Also, the quality of electrolytes for lithium-ion batteries are also of importance since the presence of contaminants significantly effects electrochemical performances of lithium-ion batteries. Thus, the organic solvents and lithium salts used for lithium-ion batteries are limited to the highest purity. Also, the contamination levels should be minimized.

SUMMARY

The present disclosure as disclosed in various embodiments addresses and overcomes the limitations of other electrolytes used with rechargeable cells or batteries such as lithium-ion cells or batteries. The present disclosure introduces the use of deuterated solvents in the synthesis of lithium-ion electrolytes to increase chemical stability of the electrolytes by reducing the rate of hydrogen related reactions during decomposition or preventing some of these parasitic reactions to occur.

In various embodiments are disclosed electrolytes for a lithium-ion cell including a lithium salt and an organic solvent isotopologue, wherein the isotopologue has deuterium substituted for a hydrogen. The electrolyte of various embodiments can further include a contaminant such as a protic impurity that can contribute to electrolyte decomposition. The isotopologue of various embodiments can further include an isotope other than deuterium substituted for a component other than hydrogen.

In various embodiments are disclosed lithium-ion cells including an anode, a cathode, and an electrolyte with an organic solvent isotopologue contacting the anode and cathode, wherein the isotopologue has deuterium substituted for a hydrogen. The electrolyte of various embodiments can further include a contaminant such as a protic impurity that can contribute to electrolyte decomposition. The isotopologue of various embodiments can further include an isotope other than deuterium substituted for a component other than hydrogen.

In various embodiments are disclosed methods and processes of manufacturing a lithium-ion cell including: providing an anode and cathode; and disposing an electrolyte with an organic solvent isotopologue between the anode and cathode; wherein the electrolyte contacts the anode and cathode and the isotopologue has deuterium substituted for a hydrogen. The electrolyte of various embodiments can further include a contaminant such as a protic impurity that can contribute to electrolyte decomposition. The isotopologue of various embodiments can further include an isotope other than deuterium substituted for a component other than hydrogen.

BRIEF DESCRIPTION OF THE DRAWINGS

For a further understanding of the nature, objects, and advantages of the present disclosure, reference should be had to the following detailed description, read in conjunction with the following drawings, wherein like reference numerals denote like elements and wherein:

FIG. 1 is a schematic cross-section of a rechargeable battery or a lithium-ion cell according to various embodiments.

DETAILED DESCRIPTION

As required, detailed embodiments of the present disclosure are disclosed herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art.

Except in the examples, or where otherwise expressly indicated, all numerical quantities in this description indicating amounts of material or conditions of reaction and/or use are to be understood as modified by the word "about". The first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this disclosure is not limited to the specific embodiments and methods described below, as specific components and/or conditions may, of course, vary. Furthermore, the terminology used herein is used only for describing particular embodiments and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "or" is understood to mean "and/or".

The terms "isotopologue" and "isotopologues" are in accordance with IUPAC Compendium of Chemical Terminology 2nd Edition (1997) and refer to a molecular entity that differs only in isotopic composition such as the number of isotopic substitutions. Examples of isotopologues include singly-substituted isotopologues having a single isotope substitution, double substituted isotopologues having two isotope substitutions, or multiply-substituted isotopologues having multiple isotope substitutions.

The terms "isotope" and "isotopes" are in accordance with IUPAC Compendium of Chemical Terminology 2nd Edition (1997) and refer to nuclides having the same atomic number but different mass numbers. Examples of isotopes include deuterium, carbon-13, nitrogen-15, oxygen-17, oxygen-18, sulfur-33, sulfur-34, chlorine-37, or bromine-81.

The term "organic solvent" is understood to mean organic compounds capable of solvating lithium ions. Organic solvents can also include non-aqueous compounds.

The term "alkyl" as used herein means $C_{1-20}$, linear, branched, saturated or at least partially and in some cases fully unsaturated (i.e., alkenyl and alkynyl) hydrocarbon chains, including for example, methyl, ethyl, propyl, isopropyl, butyl, isobutyl, tert-butyl, pentyl, hexyl, octyl, ethenyl, propenyl, butenyl, pentenyl, hexenyl, octenyl, butadienyl, propynyl, butynyl, pentynyl, hexynyl, heptynyl, and allenyl groups. "Lower alkyl" refers to an alkyl group having 1 to about 8 carbon atoms (i.e., a $C_{1-8}$ alkyl), e.g., 1, 2, 3, 4, 5, 6, 7, or 8 carbon atoms. Lower alkyl can also refer to a range between any two numbers of carbon atoms listed above. "Higher alkyl" refers to an alkyl group having about 10 to about 20 carbon atoms, e.g., 10, 11, 12, 13, 14, 15, 16, 17, 18, 19, or 20 carbon atoms. Higher alkyl can also refer to a range between any two number of carbon atoms listed above.

The term "aryl" as used herein means an aromatic substituent that can be a single aromatic ring, or multiple aromatic rings that are fused together, linked covalently, or linked to a common group, such as, but not limited to, a methylene or ethylene moiety. The common linking group also can be a carbonyl, as in benzophenone, or oxygen, as in diphenylether. Examples of aryl include, but are not limited to, phenyl, naphthyl, biphenyl, and diphenylether, and the like. Aryl groups include heteroaryl groups, wherein the aromatic ring or rings include a heteroatom (e.g., N, O, S, or Se). Exemplary heteroaryl groups include, but are not limited to, furanyl, pyridyl, pyrimidinyl, imidazoyl, benzimidazolyl, benzofuranyl, benzothiophenyl, quinolinyl, isoquinolinyl, thiophenyl, and the like. The aryl group can be optionally substituted (a "substituted aryl") with one or more aryl group substituents, which can be the same or different, wherein "aryl group substituent" includes alkyl (saturated or unsaturated), substituted alkyl (e.g., haloalkyl and perhaloalkyl, such as but not limited to —$CF_3$), cylcoalkyl, aryl, substituted aryl, aralkyl, halo, nitro, hydroxyl, acyl, carboxyl, alkoxyl (e.g., methoxy), aryloxyl, aralkyloxyl, thioalkyl, thioaryl, thioaralkyl, amino (e.g., aminoalkyl, aminodialkyl, aminoaryl, etc.), sulfonyl, and sulfinyl.

The terms "cell" or "cells" are understood to be electrochemical energy storage units that uses chemical energy to produce electrical energy. The terms "battery" or "batteries" are understood to be multiple cells that are joined together. The joined multiple cells can be joined together, for example, in series or parallel, or in a combination of both.

The term "electrode" or "electrodes" are understood to refer to an anode or cathode.

The terms "percent" and "ratio" can be understood to be by weight or by volume when applicable.

The present disclosure as disclosed in various embodiments addresses and overcomes the limitations of other electrolytes used with rechargeable cells or batteries. The present disclosure introduces the use of deuterated solvents in the synthesis of lithium-ion electrolytes to increase the chemical stability of the electrolytes by reducing the rate of hydrogen related reactions during decomposition. The use of deuterated solvents can increase cell or battery capacity, power, and life by allowing electrolyte use closer, or beyond, normal voltage and temperature limits as well as in the presence of higher levels of contaminants such as water.

In various embodiments are disclosed electrolytes for a lithium-ion cell including a lithium salt and an organic solvent isotopologue, wherein the isotopologue has deuterium substituted for a hydrogen. The electrolyte of various embodiments can further include a contaminant such as a protic impurity that can contribute to electrolyte decomposition. The isotopologue of various embodiments can further include an isotope other than deuterium substituted for a component other than hydrogen.

The isotopologue of various embodiments is at least one of a carbonate-, ester-, ether-, ketone-, phosphine-, amine-, phosphine-, or glyme-based solvent or a halogenated solvent.

The isotopologue of various embodiments can include a $C_1$, $C_2$, $C_3$, $C_4$, $C_5$, $C_6$, $C_7$, $C_8$, $C_9$, $C_{10}$, $C_{11}$, $C_{12}$, $C_{13}$, $C_{14}$, $C_{15}$, $C_{16}$, $C_{17}$, $C_{18}$, $C_{19}$, or $C_{20}$ alkyl; a $C_6$, $C_7$, $C_8$, $C_9$, $C_{10}$, $C_{11}$, $C_{12}$, $C_{13}$, $C_{14}$, $C_{15}$, $C_{16}$, $C_{17}$, or $C_{18}$ aryl; or combinations thereof. In various embodiments, the alkyl or aryl can be a range between any two alkyl or aryl groups listed above. The akyl or aryl of various embodiments can have deuterium substituted for a hydrogen. The alkyl of various embodiments can be a higher or lower alkyl.

In various embodiments, the isotopologue has deuterium substituted for 3, 4, 5, 6, 7, 8, 9, 10, 11, 12, 13, 14, 15, 16, 17, 18, 19, or 20 hydrogens. In various embodiments, the number of hydrogens substituted with deuterium is a range between any two numbers of hydrogen listed above.

In various embodiments, the isotopologue has deuterium substituted for 10 percent, 15 percent, 20 percent, 25 percent, 30 percent, 35 percent, 40 percent, 45 percent, 50 percent, 55 percent, 60 percent, 65 percent, 70 percent, 75 percent, 80 percent, 85 percent, 90 percent, 95 percent, or 100 percent of hydrogens. In various embodiments, the percentage of deuterium substituted for hydrogens is a range between any two percentages listed above.

The contaminant of various embodiments is a protic impurity. Examples of protic impurities include aqueous compounds, water, alcohols, halogen containing compounds such as hydrofluoric acid, metal ions, or decomposition products of the electrolyte or electrolyte additives. In various embodiments, the concentration of the contaminant in the electrolyte is at least or is 1 part(s) per million (ppm), 5 ppm, 10 ppm, 50 ppm, 60 ppm, 70 ppm, 80 ppm, 90 ppm, 100 ppm, 150 ppm, 200 ppm, 250 ppm, 300 ppm, 350 ppm, 400 ppm, 450 ppm, 500 ppm, 550 ppm, and 600 ppm. In various embodiments, the concentration of the contaminant in the electrolyte is a range between any two concentrations listed above.

The isotopologue of various embodiments can further include an isotope or isotopes other than deuterium substituted for a component or components other than hydrogen. The isotopes other than deuterium of various embodiments can include different isotopes. Examples of isotopes other than deuterium can include at least one of: a carbon isotope such as carbon-13 substituted for a carbon (e.g. carbon-12); a nitrogen isotope such as nitrogen-15 substituted for a nitrogen (e.g. nitrogen-14); an oxygen isotope such as oxygen-17 or oxygen-18 substituted for an oxygen (e.g. oxygen-16); a sulfur isotope such as sulfur-33 or sulfur-34 substituted for a sulfur (e.g. sulfur-32); and a halogen isotope such as chlorine-37 or bromine-81, substituted for a halogen.

In various embodiments, the isotopologue has isotopes other than deuterium substituted for 1, 2, 3, 4, 5, 6, 7, 8, 9, 10, 11, 12, 13, 14, 15, 16, 17, 18, 19, or 20 components other than hydrogen. In various embodiments, the number of components other than hydrogen substituted with isotopes other than deuterium is a range between any two numbers of components other than hydrogen listed above.

In various embodiments, the isotopologue has isotopes other than deuterium substituted for 1 percent, 10 percent, 15 percent, 20 percent, 25 percent, 30 percent, 35 percent, 40 percent, 45 percent, 50 percent, 55 percent, 60 percent, 65 percent, 70 percent, 75 percent, 80 percent, 85 percent, 90 percent, 95 percent, or 100 percent of components other than hydrogen. In various embodiments, the percentage of isotopes other than deuterium substituted for components other than hydrogen is a range between any two percentages listed above.

The organic solvent isotopologue of various embodiments can include a plurality of different organic solvent isotopologues, with each isotopologue having deuterium substituted for a hydrogen.

In various embodiments, the electrolyte has a lithium salt concentration or molarity of at most or of 0.5 M, 0.6 M, 0.7 M, 0.8 M, 0.9 M, 1 M, 1.1 M, 1.2 M, 1.3 M, 1.4 M, and 1.5 M. In various embodiments, the concentration or molarity of the lithium salt in the electrolyte is a range between any two concentrations or molarities listed above.

In various embodiments are disclosed lithium-ion cells including an anode, a cathode, and an electrolyte with an organic solvent isotopologue contacting the anode and cathode, wherein the isotopologue has deuterium substituted for a hydrogen. The electrolyte of various embodiments can further include a contaminant such as a protic impurity that can contribute to electrolyte decomposition. The isotopologue of various embodiments can further include an isotope other than deuterium substituted for a component other than hydrogen.

The lithium-ion cells of various embodiments can further include an ionically-conductive separator between the anode and cathode, where the electrolyte also contacts the separator. The lithium-ion cells of various embodiments can be positioned in a manner to form a lithium-ion battery. An example of a lithium-ion battery of various embodiments is lithium-ion cells packaged together and connected in series or parallel. Examples of lithium-ion cells or lithium-ion batteries of various embodiments include prismatic cell(s)/prismatic cell(s) battery packs or pouch cell(s)/pouch cell(s) battery packs.

The electrolyte of various embodiments can include an organic solvent from which the organic solvent isotopologue is an isotopologue of an organic solvent used in the electrolyte, wherein the organic solvent isotopologue replaces a portion of the organic solvent. In various embodiments, the organic solvent isotopologue replaces 10 percent, 15 percent, 20 percent, 25 percent, 30 percent, 35 percent, 40 percent, 45 percent, 50 percent, 55 percent, 60 percent, 65 percent, 70 percent, 75 percent, 80 percent, 85 percent, 90 percent, 95 percent, or 100 percent of the organic solvent. In various embodiments, the percentage of the organic solvent replaced by the organic solvent isotopologue is a range between any two percentages listed above.

In various embodiments, lithium-ion cells with an organic solvent isotopologue have a cell life (i.e. discharge/charge cycles) that is greater than lithium-ion cells without an organic solvent isotopologue. In one embodiment, lithium-ion cells with an organic solvent isotopologue have a cell life of at least 300 charge/discharge cycles. In another embodiment, lithium-ion cells with an organic solvent isotopologue have a cell life of at least 500 charge/discharge cycles. In another embodiment, lithium-ion cells with an organic solvent isotopologue have a cell life of at least 1000 charge/discharge cycles.

In various embodiments, lithium-ion cells with an organic solvent isotopologue have a cell life of or at least of 300 charge/discharge cycles, 500 charge/discharge cycles, 700 charge/discharge cycles, 900 charge/discharge cycles, 1100 charge/discharge cycles, 1300 charge/discharge cycles, or 1500 charge/discharge cycles. The cell life of the lithium-ion cells of various embodiments is a range between any two charge/discharge cycles listed above.

In various embodiments, the electrolyte with the organic solvent isotopologue has a decomposition rate that is less than a decomposition rate of the electrolyte devoid of the isotopologue. The rate of decomposition or the rate of contaminant generation of the electrolyte with the organic solvent isotopologue of various embodiments is reduced as compared to a lithium-ion cell without the isotopologue when the lithium-ion cell is in a state of discharging current or charging/recharging. There are various of causes for the decomposition rate or the contaminant generation rate such as parasitic reactions. The decrease in the decomposition rate can also be related to the decrease in gas generation, where the cell has a 10% or 20% reduction in overall pressure from the gas generated during the life of the cell when compared to an otherwise identical lithium-ion cell devoid of the isotopologue. In other embodiments, the reduction in overall pressure translates in a corresponding reduction in cell expansion.

In various embodiments, the electrolyte with the organic solvent isotopologue has a voltage window that is greater than a voltage window of the electrolyte devoid of the isotopologue. In one embodiment, the electrolyte with the organic solvent isotopologue has a voltage window that is at least 2.5 volts (V), 2.6 V, 2.7 V, 2.8 V, 2.9 V, 3 V, 3.1 V, 3.2 V, 3.3 V, 3.4 V, 3.5 V, 3.6 V, 3.7 V, 3.8 V, 3.9 V, 4 V, 4.1 V, 4.2 V, 4.3 V, 4.4 V, 4.5 V, 4.6 V, 4.7 V, 4.8 V, 4.9 V, 5 V, 5.1 V, 5.2 V, 5.3 V, 5.4 V, 5.5 V, 5.6 V, 5.7 V, 5.8 V, 5.9 V, or 6 V. In various embodiments, the electrolyte with the organic solvent isotopologue has a voltage window that is a range between two voltages listed above.

In various embodiments, the electrolyte with the organic solvent isotopologue has a temperature operation window that is greater than a temperature operation window of the electrolyte devoid of the isotopologue. In various embodiments, the temperature operation window ranges between any of two of the following temperatures: −40° C., −35° C., −30° C., −25° C., −20° C., −15° C., −10° C., −5° C., 0° C., 5° C., 10° C., 15° C., 20° C., 25° C., 30° C., 35° C., 40° C., 45° C., 50° C., 55° C., 60° C., 65° C., 70° C., 75° C., or 80° C.

In various embodiments, the lithium-ion cell has a volume ratio of electrolyte with the organic solvent isotopologue that is or that is less than 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, or 3.5 times the total pore volume of the electrode such as an anode or cathode. In various embodiments, the volume ratio of electrolyte with the organic solvent isotopologue is a range between any two factors listed above.

In various embodiments, the lithium-ion cell generates less of a solid electrolyte interface, or more generally film buildup, on the electrode than an otherwise identical lithium-ion cell devoid of the isotopologue during a charging or discharging state. Thus, the lithium-ion cell of various embodiments has reduced internal resistances and improved power characteristics as compared, for example, to the otherwise identical lithium-ion cell devoid of the isotopologue.

In various embodiments, the lithium-ion cell loses less capacity per charging/discharging cycle than an otherwise identical lithium-ion cell devoid of the isotopologue.

In various embodiments, the lithium-ion cell generates less halogen containing compounds such as hydrofluoric acid than an otherwise identical lithium-ion cell devoid of the isotopologue when stored over a time period. The time period of various embodiments is 0 months, 1 months, 2 months, 3 months, 4 months, 5 months, 6 months, 7 months, 8 months, 9 months, 10 months, 11 months, 12 months, 13 months, 14 months, 15 months, 16 months, 17 months, 18 months, 19 months, 20 months, 21 months, 22 months, 23 months, or 24 months. In various embodiments, the time period is a range between any two periods of time listed above.

In various embodiments are disclosed methods and processes of manufacturing a lithium-ion cell including: providing an anode and cathode; and disposing an electrolyte with an organic solvent isotopologue between the anode and cathode; wherein the electrolyte contacts the anode and cathode and the isotopologue has deuterium substituted for a hydrogen. The electrolyte of various embodiments can further include a contaminant such as a protic impurity that can contribute to electrolyte decomposition. The isotopologue of various embodiments can further include an isotope other than deuterium substituted for a component other than hydrogen. The methods and processes of various embodiments can further include providing an ionically-conductive separator in contact with the electrolyte and located between the anode and cathode.

With reference to FIG. 1, a cell 10 is shown, which may be part of a secondary or rechargeable battery (e.g., a lithium-ion battery). The cell 10 includes a negative electrode (anode) 11, a positive electrode (cathode) 13, a separator 12, and an electrolyte 16 disposed within the electrodes 11, 13 and separator 12. However, the cell 10 may include additional components or may not require all the components shown, depending on the battery type or configuration. In addition, a current collector 14,15 may be disposed on one or both of the anode 11 and cathode 13. In at least one embodiment, the current collector 14,15 is a metal or metal foil. In one embodiment, an anode current collector 14 is formed of copper, while a cathode current collector 15 is formed of aluminum. Examples of other suitable metal foils may include, but are not limited to, stainless steel, nickel, gold, or titanium.

In various embodiments, the anode 11 may include an active material comprising a carbonaceous material, such as graphite (natural, artificial, or surface-modified natural), hard carbon, soft carbon, or Si/Sn-enriched graphite. Non-carbonaceous active materials may also be used, such as lithium titanate oxide (LTO), silicon and silicon composites, lithium metal, and nickel oxide (NiO). In another embodiment, the cathode 13 may include an active material comprising lithium nickel cobalt aluminum oxide (NCA), lithium nickel manganese cobalt oxide (NMC), lithium manganese spinel oxide (Mn Spinel or LMO), lithium iron phosphate (LFP) and its derivatives lithium mixed metal phosphate (LFMP), sulfur or sulfur-based materials (e.g., sulfur-carbon composites) or carbon-based cathodes. In addition, mixtures of any of two or more of these materials may be used. These electrode active materials are merely examples, however, any electrode materials known in the art may be used. The separator 12 may be formed of any suitable ionically conductive, electrically insulating material. In one embodiment, the separator 12 may be a polymer separator, for example, a polyolefin separator (e.g., polyethylene or polypropylene).

Electrode production may include casting a slurry onto a current collector 14,15 and drying the slurry to form an electrode (e.g., anode 11 and/or cathode 13). The slurry may include active material, electrically conductive material, binder, and/or solvent. The composite slurry may be spread evenly onto the current collector 14,15 during casting to facilitate a uniform electrode. The electrically conductive material in the electrode may include carbon. If the anode active material is a carbonaceous material, the electrically conductive material may be excluded. The carbon may be in any suitable form, such as graphite, carbon black, graphene, carbon nanotubes, or others, or a combination thereof. Non-limiting examples of binders that may be used in the electrodes include carboxymethylcellulose (CMC), poly(vinylidene fluoride) (PVDF) binders, poly(acrylic acid) (PAA), polyacrylonitrile (PAN), polytetrafluoroethylene (PTFE, e.g., Teflon), styrene-butadiene rubber/carboxymethylcellulose (SBR/CMC), or others.

The electrolyte 16 may be a liquid or solid electrolyte and includes a lithium salt 17 and an organic solvent isotopologue 18. Examples of lithium salts 17 may include $LiPF_6$, $LiBF_4$, $LiAsF_6$, or $LiClO_4$. The electrolyte 16 can also be a liquid, solid, colloid, or gel. The electrolyte 16 may also include a contaminant 19 such as a protic impurity.

The organic solvent isotopologue 18 is an organic solvent having deuterium substituted for a hydrogen. The organic solvent isotopologue 18 can have an alkyl or aryl, where deuterium can be substituted for a hydrogen.

Examples of organic solvents may include ethylene carbonate (EC), dimethyl carbonate (DMC), ethyl methyl carbonate (EMC), diethyl carbonate (DEC), or mixtures thereof. Other examples of organic solvents can include: adiponitrile ($NC(CH_2)_4CN$); allyl methyl sulfone ($C_4H_8O_2S$); tert-Amylbenzene ($C_{11}H_{16}$); 1,4-di-tert-butyl-2,5-bis(2-methoxyethoxy)benzene ($C_{20}H_{34}O_4$); diethyl sulfite (($C_2H_5O)_2SO$); ethylene sulfite ($C_2H_4O_3S$); fluoroethylene carbonate ($C_3H_3FO_3$); 3-(methylsulfonyl)-1-propyne ($C_4H_6O_2S$); phenylcyclohexane ($C_6H_5C_6H_{11}$); 1,3-propanesultone ($C_3H_6O_3S$); 1,2-propyleneglycol sulfite ($C_3H_6O_3S$); propylene sulfate ($C_3H_6O_4S$); 1,3-propylene sulfite ($C_3H_6O_3S$); 2-propynyl methanesulfonate ($C_4H_6O_3S$); tetrahydrofuran ($C_4H_8O$); and vinylene carbonate ($C_3H_2O_3$).

Deuterium (D or $^2H$) is one of two stable isotopes of hydrogen; although it has generally about the same chemical properties as normal hydrogen, its larger mass (due to the presence of a neutron in the nucleus) leads a stronger interaction and a lower reactivity with other species. More specifically, a mechanism known as the kinetic isotope effect impacts the zero-point energy of isotopes and forms the basis for the reactivity differences between isotopomers. The present disclosure as disclosed in various embodiments therefore substitutes deuterium in organic solvents to slow the kinetics of numerous chemical reactions involving hydrogen that lead to electrolyte decomposition in lithium-ion cells. This rationale is further supported by recent developments in the pharmaceutical field where substituted deuterium reduces drug decomposition and increases its lifetime. Carbon-deuterium bonds are stronger than equivalent bonds to hydrogen, leading to differences in reactivity of the deuterated solvents that can be up to six, seven, eight, nine, or ten times slower than equivalent non-deuterated solvents.

The present disclosure as disclosed in various embodiments is herein implemented for lithium-ion battery electrolytes including mixtures of alkyl carbonates including ethylene carbonate, dimethyl, diethyl, and ethyl-methyl carbonates (EC, DMC, DEC, EMC, respectively), and lithium salts such as $LiPF_6$, $LiBF_4$, $LiAsF_6$, or $LiClO_4$. In the present approach, the regular solvents are replaced by their deuterated equivalents during cell electrolyte production. More specifically, the following deuterated variants of these organic compounds may be selected: Ethylene carbonate-$d_4$ ($C_3D_3O_3$), Diethyl-$d_{10}$ carbonate ($CD_3CD_2OC(O)OCD_2CD_3$), Dimethyl-$d_6$ carbonate (($CD_3O)_2CO$) for example. The lithium-ion battery electrolytes can also include contaminants such as protic impurities including water in varying amounts. Also, these examples of deuterated variants can also include other components beings substituted with isotopes such as a carbon being substituted with carbon-13 or oxygen substituted with oxygen-17 or oxygen-18.

The present disclosure as disclosed in various embodiments uses carbon-deuterium bonds, which are stronger than the equivalent bonds to hydrogen. The reactivity of these carbon-deuterium bonds are also six to ten times slower. These properties of carbon-deuterium bonds are capable of reducing the rate of parasitic reactions that can cause electrolyte decomposition. The improvement applies to the present electrolyte solvent molecules as they contain numerous hydrogen atoms participating in parasitic reactions. Such reactions include those that produce $H_2$, $CH_4$, $H_2O$, for example. In particular, the present disclosure as disclosed in various embodiments addresses the breakage of C—H bonds in various solvents (EC, DMC, DEC, EMC) that leads to the formation of hydrogen gas ($H_2$), hydrogen fluoride (HF), water ($H_2O$), methane ($CH_4$), Ethylene $C_2H_4$, Ethane ($C_2H_6$) and Propene ($C_3H_6$), for instances. These species can be created as primary or secondary products when Li-ion cells electrolytes decompose. The deuterium substitution effectively reduces electrolyte decomposition by reducing the rate of these reactions. This in turn improves robustness under conditions where decomposition is usually severe, i.e. near voltage and temperature limits, and in the presence of contaminants (e.g. water). The result is a more robust cell chemistry allowing for improved capacity, power, and durability.

The present disclosure as disclosed in various embodiments uses the kinetic isotope effect to improve electrolyte stability. The kinetic isotope effect (KIE) is the change in the reaction rate of a chemical reaction when one of the atoms in the reactants is replaced by one of its isotopes. The ratio of rate constants for the reactions involving the light (kL) and the heavy (kH) isotopically substituted reactants is given by:

$$KIE = \frac{kL}{kH}$$

This change in rate results from heavier isotopologues having a lower velocity/mobility and an increased stability from the higher dissociation energies when compared to the compounds containing lighter isotopes.

Isotopic rate changes are most pronounced when the relative mass change is greatest, since the effect is related to vibrational frequencies of the affected bonds. For instance, changing a hydrogen atom (H) to its isotope deuterium (D) represents a 100% increase in mass, whereas in replacing carbon-12 with carbon-13, the mass increases by only 8 percent. The rate of a reaction involving a C—H bond is typically 6-10 times faster than the corresponding C-D bond, whereas a 12C reaction is only 4 percent faster than the corresponding 13C reaction (even though, in both cases, the isotope is one atomic mass unit heavier).

As a result of the kinetic isotope effect, deuterium substitution in electrolyte solvents may slow down reactions involving hydrogen gas as a final product, and also those producing hydrogen containing final products (e.g. water, methane) that are especially detrimental to cell performance (examples below).

The following examples illustrate the various embodiments of the present invention. Those skilled in the art will recognize many variations that are within the spirit of the present invention and scope of the claims.

Example 1

The following reactions show the production of methane from DMC in the over discharged state:

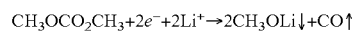

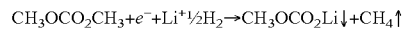

In an ideal case of substitution, the same mechanism involving deuterium would have a slower reaction rate:

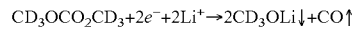

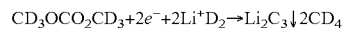

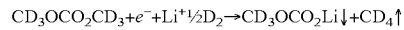

The use of DEC and EMC includes similar reactions to the ones shown above.

Example 2

The following reaction occur in the overcharged state is considered:

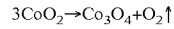

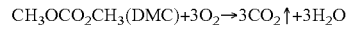

In an ideal case of substitution, the same mechanism would have slower reaction kinetics:

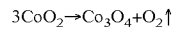

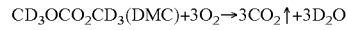

The last reactions show oxygen generation due to the degradation of the cathode material and the decomposition of electrolytes by the generated oxygen, respectively. Note that water formation is this case would be a hindrance as it would be more difficult to "pluck out" deuterium from the solvent. Also, water is especially detrimental to cell stability as it is a precursor to hydrofluoric acid.

Example 3

Preparation of Electrolytes

A lithium salt (e.g. $LiPF_6$) is added to ethylene carbonate-$d_4$, diethyl-$d_{10}$ carbonate, and dimethyl-$d_6$ carbonate such that a molar concentration of electrolyte is obtained. In other examples, lithium salt is added to mixtures of ethylene carbonate-$d_4$/ethylene carbonate, diethyl-$d_{10}$ carbonate/diethyl carbonate, and dimethyl-$d_6$ carbonate/dimethyl carbonate that have a ratio of isotopologue to organic solvent of 1:10 and 1:50. Further, for testing purposes, known concentrations of contaminants such as water and hydrofluoric acid is added to the electrolytes using a moisture titrator. In other examples, ethylene carbonate-$d_4$, diethyl-$d_{10}$ carbonate, and dimethyl-$d_6$ carbonate includes other isotopic substitutions such as carbon-13 substituted for carbon-12.

Example 4

Preparation of Lithium-Ion Cells

For the assembly of lithium ion full cells, a pouch setup or prismatic setup can be used. The pouch (or pouchbag) setup includes a flat cell geometry with a case of flexible aluminum laminated multilayer foil. The electrodes are arranged in a linear, layered setup. Electrodes of lithium nickel manganese cobalt oxide and mesophase carbon microbead graphite are used as cathode and anode, respectively. The electrodes, collectors, and electrolytes are filled in each pouch cell. A separator is used with the anode and cathode. The cells are assembled in a dry environment such as an argon atmosphere.

Example 5

Testing of Lithium-Ion Cells
Testing for the Determination of Battery Electrolyte Improvement Electrolyte decomposition in battery cells results in the loss of electrochemically active material or sites from the battery cell components, which results in a capacity loss. Additionally, the decomposition products may take the form of gas or solid. Gas formation inside the cell leads to pressure build-up and cell swelling. Solid film deposits on the surface of the electrodes may increase the internal cell resistance by impeding ion diffusion at interfaces. Various test methods can be used to measure electrolyte decomposition, and more specifically, electrolyte solvent decomposition. In any case, the improvement in electrolyte composition/design is determined by comparing the results of a test conducted on a battery cell containing the modified electrolyte solvent to those of a same test conducted on a cell containing the regular electrolyte solvent. Some non-limiting testing is described below.
Capacity Testing Battery cell capacity is a measure of stored coulombs or Ampere-hour (Ah). Capacity tests evaluate the amount of charge in Ah the battery can deliver from a maximum to a minimum state of charge (and vice versa). Capacity is tested by applying a current in order to increase the voltage of a battery cell from its lower operation voltage (Vmin) to it higher operation voltage (Vmax). The time integrated current (in Ah) between these two points determines the usable capacity of the battery cell. Repeated capacity tests reveal a rate of capacity loss over cycling/time. In practice, to more quickly assess an improvement in electrolyte against decomposition, capacity cycle tests are to be performed at a high temperature (e.g. >60° C.) and/or over a larger voltage window in order to increase decomposition rate. As a first approximation, a cell containing an electrolyte solvent that has 10% of its hydrogen substituted for deuterium shows a proportional (10%) decrease in capacity loss over a given time when compared with the same cell filled with a "regular" electrolyte tested under the same conditions. Increasing deuterium substitution enhances this effect. Cells with 1:10 and 1:50 volume ratios of isotopologue to regular solvent show improvements over the regular electrolytes. Also, cells containing 10% of its hydrogen substituted for deuterium and carbon carbon-13 substituted for carbon-12 show decrease in capacity loss over a given time when compared with the same cell filled with an electrolyte solvent that has 10% of its hydrogen substituted for deuterium.
Cell Pressure Build-Up and Swelling Testing As pressure builds-up inside battery cells, the cell container (which is a "pouch" in the case of a so-called pouch cell or a "can" in the case of a prismatic cell) expands in volume or thickness. The expansion is created and accelerated in various ways under controlled conditions using a thermal chamber and battery cycler. For instance, the cell is exposed over an extended period of time to a high voltage (>4.0 V), a low voltage (<2.5 V), a high temperature (>60° C.) or a combination of these conditions. Such expansion is measurable with a caliper, a ruler or from a camera recording. Cells containing an electrolyte solvent that has 10% of its hydrogen substituted for deuterium has proportionally less (10%) increase in thickness (e.g. $\Delta x=0.9$ vs 1.0 cm) over time, when cycled above the normal maximum temperature (e.g. T>60° C.) or beyond the normal voltage window (or a combination of both), when compared with the same cell filled with a regular electrolyte and tested under the same conditions. Increasing deuterium substitution enhances this effect. Cells with 1:10 and 1:50 volume ratios of isotopologue to regular solvent show improvements over the regular electrolytes. Also, cells containing 10% of its hydrogen substituted for deuterium and carbon carbon-13 substituted for carbon-12 show further improvement.
Internal Resistance Testing The internal resistance of a battery causes a change in its voltage under a current load. Battery cell internal resistance has an electronic component due to the resistivity of the component materials and an ionic component due to electrochemical factors such as electrolyte conductivity, ion mobility, and electrode surface area. Measurement of the internal resistance of a battery is a guide to its condition, and electrolyte decomposition can be expected to increase internal resistance as result of film formation at electrode surfaces. There are various ways to measure internal resistance. For example, a measured current pulse is applied across the battery. In this case, the internal resistance is a function of the voltage change at that current (e.g. V=R*I). Other methods include AC Conductance or Electrochemical Impedance Spectroscopy (EIS). Cells containing an electrolyte solvent that has 10% of its hydrogen substituted for deuterium has proportionally less (10%) increase in internal resistance (e.g. $\Delta R=0.9$ vs 1.0 mΩ) over time, when cycled above the normal maximum temperature (e.g. T>60° C.) or beyond the normal voltage window, when compared with the same cell filled with a "regular" electrolyte and tested under the same conditions. Increasing deuterium substitution enhances this effect. Cells with 1:10 and 1:50 volume ratios of isotopologue to regular solvent show improvements over the regular electrolytes. Also, cells containing 10% of its hydrogen substituted for deuterium and carbon carbon-13 substituted for carbon-12 show further improvement.
Detection of Decomposition Products Decomposition within the lithium-ion cell leads to the formation of decomposition products. The presence of contaminants such as protic impurities can act as a catalyst for reactions forming decomposition products. For example, protic impurities in the ppm range are very difficult to measure and control but are known to negatively affect the function of high voltage lithium ion battery system. Trace amounts of water can have negative effects on the cycling and storage stability of the battery. For $LiPF_6$-based electrolytes which are most important in commercial secondary lithium systems, the negative effects of water are tremendous. Particularly, water and other protic impurities react with the $LiPF_6$ forming hydrofluoric acid and other acidic species. These acids react with the solid electrolyte interface and the cathode active materials especially lithium manganese spinel which results in inferior performance of the battery. In other lithium-ion systems, the content of water as well as other protic impurities like alcohols in the $LiPF_6$-based systems is carefully controlled. The present disclosure as disclosed in various embodiments improves on other lithium-ion systems as shown below.

For the thermal aging of electrolytes, the electrolytes are stored for a time period such as at 90° C. for 2 weeks or at 70° C. and 70% relative humidity for 0, 2, 6, 12, and 24 months. After the time period, the samples of different electrolytes are tested using a hybrid ion-trap time-of-flight mass spectrometer. It is also worth noting that other types of testing can be conducted after the aging process such as analysis of cell thickness, power, and capacity. Electrolytes without deuterium shows increasing levels of decomposition products with longer storage periods. Testing of electrolytes without deuterium does not show this. Instead, testing using the hybrid ion-trap time-of-flight mass spectrometer shows decrease in decomposition products with electrolyte solvents having 10% of its hydrogen substituted for deuterium as compared to electrolyte solvents without deuterium. Increasing deuterium substitution enhances this effect. Electrolytes with 1:10 and 1:50 volume ratios of isotopologue to regular solvent show a decrease in decomposition products. Also, electrolytes with 10% of its hydrogen substituted for deuterium and carbon carbon-13 substituted for carbon-12 show a decrease decomposition products as well.

For analysis of the electrolyte after electrochemical cycling, the cells are cycled in a climatic test chamber set from 20 to 70° C. The cycling procedure consists of two slow formation steps with a constant-current-constant-voltage (CCCV) cycling step and a charge rate (C-Rate; C) with 0.1 C for three cycles and a CCCV cycling step with 0.5 C for three cycles. Afterward, the cells are cycled with a CCCV cycling at 2.0 C for 100 cycles. The C-Rate is referred to a complete charge within 1 h in case of 1.0 C. With 2.0 C, the cell is charged within half an hour. The discharge steps with the corresponding specific current rates are performed with a constant-current cycling step. For reproducibility checks, all cells are investigated twice. After electrochemical cycling, the pouch cells are opened in the dry room and samples are taken from the pouch cells for analysis using a hybrid ion-trap time-of-flight mass spectrometer. Testing using the hybrid ion-trap time-of-flight mass spectrometer shows decrease in decomposition products with electrolyte solvents having 10% of its hydrogen substituted for deuterium as compared to electrolyte solvents without deuterium. Increasing deuterium substitution enhances this effect. Electrolytes with 1:10 and 1:50 volume ratios of isotopologue to regular solvent show a decrease in decomposition products. Also, electrolytes with 10% of its hydrogen substituted for deuterium and carbon carbon-13 substituted for carbon-12 show a decrease in decomposition products as well.

In both the thermal aging and electrochemical cycling of the electrolytes, the concentration of halogen containing compounds such as hydrofluoric acid increases at a slower rate or does not increase for electrolyte solvents having 10% of its hydrogen substituted for deuterium as compared to electrolyte solvents without deuterium. Increasing deuterium substitution enhances this effect. Electrolytes with 1:10 and 1:50 volume ratios of isotopologue to regular solvent show a decrease concentrations of halogen containing compounds. Also, electrolytes with 10% of its hydrogen substituted for deuterium and carbon carbon-13 substituted for carbon-12 show a decrease concentrations of halogen containing compounds.

While exemplary embodiments are described above, it is not intended that these embodiments describe all possible forms of the present disclosure as disclosed in various embodiments. Rather, the words used in the specification are words of description rather than limitation, and it is understood that various changes may be made without departing from the spirit and scope of the present disclosure as disclosed in various embodiments. Additionally, the features of various implementing embodiments may be combined to form further embodiments of the present disclosure as disclosed in various embodiments.

What is claimed is:

1. An electrolyte for a lithium-ion cell comprising
   a lithium salt;
   a contaminant; and
   an organic solvent isotopologue having deuterium substituted for hydrogen.

2. The electrolyte of claim 1, wherein the isotopologue is a carbonate-, ester-, ketone-, phosphine-, amine-based, or halogenated solvent.

3. The electrolyte of claim 1, wherein the isotopologue has deuterium substituted for at least 10 percent of hydrogen.

4. The electrolyte of claim 1, wherein the contaminant is a protic impurity.

5. The electrolyte of claim 4, wherein the protic impurity is water.

6. The electrolyte of claim 4, wherein the protic impurity is hydrofluoric acid.

7. The electrolyte of claim 1, wherein the isotopologue has an isotope other than deuterium substituted for a component other than hydrogen.

8. The electrolyte of claim 7, wherein the isotope other than deuterium is a carbon isotope substituted for a carbon, a nitrogen isotope substituted for a nitrogen, an oxygen isotope substituted for an oxygen, a sulfur isotope substituted for a sulfur, and a halogen isotope substituted for a halogen.

9. The electrolyte of claim 1, wherein the electrolyte has at most about 1M lithium salt.

10. A lithium-ion cell comprising:
    an anode;
    a cathode; and
    an electrolyte with an organic solvent isotopologue and a contaminant;
    wherein the electrolyte contacts the anode and cathode and the isotopologue has deuterium substituted for hydrogen.

11. The lithium-ion cell of claim 10, wherein the isotopologue has an isotope other than deuterium for a component other than hydrogen.

12. The lithium-ion cell of claim 10, wherein the electrolyte has a decomposition rate that is less than a decomposition rate of the electrolyte devoid of the isotopologue.

13. The lithium-ion cell of claim 10, wherein the electrolyte has a voltage window that is greater than a voltage window of the electrolyte devoid of the isotopologue.

14. The lithium-ion cell of claim 10, wherein the electrolyte has a temperature operation window that is greater than a temperature operation window of the electrolyte devoid of the isotopologue.

15. The lithium-ion cell of claim 10, wherein a volume of the electrolyte is less than 3.1 times a total pore volume of the anode or cathode.

16. The lithium-ion cell of claim 10, wherein the lithium-ion cell generates less of a solid electrolyte interface or film buildup on the anode or cathode than an otherwise identical lithium-ion cell devoid of the isotopologue during a charging or discharging state.

17. The lithium-ion cell of claim 10, wherein the lithium-ion cell loses less capacity per charging/discharging cycle than an otherwise identical lithium-ion cell devoid of the isotopologue.

18. A lithium-ion battery comprising a plurality of lithium-ion cells of claim 10.

19. A method of manufacturing a lithium-ion cell comprising:
   providing an anode and cathode; and
   disposing an electrolyte with an organic solvent isotopologue and contaminant between the anode and cathode;
   wherein the electrolyte contacts the anode and cathode and the isotopologue has deuterium substituted for hydrogen.

20. The method of claim 19, wherein the isotopologue has an isotope other than deuterium for a component other than hydrogen.

* * * * *